United States Patent
Pedersen

(10) Patent No.: US 8,781,108 B2
(45) Date of Patent: *Jul. 15, 2014

(54) ADAPTIVE RINGTONE DETECTOR

(75) Inventor: Thomas Pedersen, Gorlose (DK)

(73) Assignee: GN Netcom A/S (DK)

( * ) Notice: Subject to any disclaimer, the term of this patent is extended or adjusted under 35 U.S.C. 154(b) by 0 days.

This patent is subject to a terminal disclaimer.

(21) Appl. No.: 13/611,254

(22) Filed: Sep. 12, 2012

(65) Prior Publication Data

US 2013/0243182 A1    Sep. 19, 2013

Related U.S. Application Data

(63) Continuation of application No. 13/141,247, filed as application No. PCT/DK2009/000268 on Dec. 22, 2009, now Pat. No. 8,275,122.

(30) Foreign Application Priority Data

Dec. 23, 2008  (EP) ..................... 08388047

(51) Int. Cl.
*H04M 1/00* (2006.01)
*H04M 3/00* (2006.01)
*H04M 1/08* (2006.01)
*H04M 1/60* (2006.01)
*H04M 1/654* (2006.01)

(52) U.S. Cl.
CPC .............. *H04M 1/08* (2013.01); *H04M 1/6033* (2013.01); *H04M 1/6066* (2013.01); *H04M 1/6545* (2013.01)
USPC .................. 379/448; 379/373.02; 379/373.04

(58) Field of Classification Search
CPC ... H04M 1/08; H04M 1/6033; H04M 1/6066; H04M 1/6545
USPC ................................ 379/447, 448, 456, 372, 379/373.01–373.04, 375.01, 375.04, 164, 379/179, 252, 390.01, 390.02; 455/567, 455/414.1
See application file for complete search history.

(56) References Cited

U.S. PATENT DOCUMENTS

| | | | |
|---|---|---|---|
| 5,537,657 | A | 7/1996 | King |
| 5,930,354 | A | 7/1999 | Britto et al. |
| 5,937,031 | A | 8/1999 | Stelman |

(Continued)

FOREIGN PATENT DOCUMENTS

| | | |
|---|---|---|
| CN | 1246999 | 3/2000 |
| CN | 1866979 | 11/2006 |

(Continued)

OTHER PUBLICATIONS

Chinese Office Action issued on Jul. 3, 2013 by the State Intellectual Property Office of People's Republic of China for corresponding Chinese Application No. 200980157016.0.

*Primary Examiner* — Tuan D Nguyen
(74) *Attorney, Agent, or Firm* — Altera Law Group, LLC

(57) ABSTRACT

A communications system and a method of detecting and learning new ringtones in an automatic manner, comprising a desk phone (1), a hook switch, a ringtone detector (3), and a communications device (2). In a first embodiment a mechanical hook switch device is connected to the desk phone (1), and in a second embodiment an electronic hook switch unit (9) is connected to the desk phone (1). The ringtone detector (3) adaptively sets the filter and amplifier parameters according to the sensor position and pick-up sensitivity. The ringtone detector (3) automatically detects and learns the characteristics of new ringtones. The communications device (2) may comprise a base station (6) and a headset (7).

19 Claims, 4 Drawing Sheets

(56) References Cited

U.S. PATENT DOCUMENTS

2009/0029685 A1 1/2009 Willis
2009/0143054 A1 6/2009 Drescher et al.
2009/0208036 A1 8/2009 Liu

FOREIGN PATENT DOCUMENTS

CN 1866979 A * 11/2006
SE 9 802 888 2/2000

* cited by examiner

ADAPTIVE RINGTONE DETECTOR

TECHNICAL FIELD

The invention relates to a communications system comprising a hook switch connected to a telephone device capable of hook switching the telephone when a call is accepted or terminated, a communications device in communication with the telephone device and/or the hook switch, a sensor located on the telephone device sensing a ringing signal, and a ringtone detector connected to the sensor and the communications device.

The invention also relates to a method of adaptively detecting and learning distinctive ringtones, which includes detecting a ringing signal from a sensor located on a telephone device, filtering and amplifying the detected ringing signal, comparing the processed signal to predetermined thresholds, determining one or more characteristics of a ringtone, and transmitting an alert signal to a communications device once a ringtone has been determined.

BACKGROUND ART

With the increasing number of different ringtones produced by the telephone manufacturers today, the ability to detect different ringtones in an automatic off-hook switching device becomes more and more important.

WO 99/46910 A1 describes a desk phone coupled to an interface device comprising a ringtone detector and an off-hook detector for decoupling the desk phone handset when a call is accepted on the headset. The interface device has three different ringtone learning methods which can be used to detect and learn the characteristics of a new ringtone detected on the telephone line.

JP 7240773 A describes a different telephone apparatus comprising a processor having a learning procedure which is able to detect, learn and store the characteristics of a ring cadence on the telephone line network.

U.S. Pat. No. 4,540,855 A describes a telephone apparatus containing an adaptive digital filter capable of adjusting the bandpass filter parameters to the audio information transmitted on the telephone line. The digital filter contains a phase loop lock which locks on to the periodic ringtone signal, which is lost when a call is accepted.

These devices tend to be bulky and require the desk phone to have an interface connection that enables a wired connection between the desk phone and the device.

US 2004/0131174 A1 describes a desk phone coupled to a hook switch device comprising a ringtone detector that automatically hooks off the handset when a call is accepted. The hook switch device then relays the call to a wireless headset. The user places the sensor at a position from which the strongest magnetic field is sensed during a calibration process.

None of these devices describe a ringtone detector capable of detecting and learning new ringtones with an absolute minimum of user interaction, and an automatic off-hook switch device which is compact and easy to connect and install.

DISCLOSURE OF THE INVENTION

The object of the invention is to provide an adaptive ringtone detector that is able to automatically detect and learn new ringtones for future detection. The communications system according to the invention is characterized in that the ringtone detector comprises feature extraction means connected to ringtone detection means, which detect and learn distinctive ringtones automatically. This enables the user to install the communications system with ease and requires a minimum of user interaction.

The hook switch according to claim 2 comprises a hook switching device with mechanical means for lifting and lowering a handset on the telephone device. This enables the user to remotely lift and lower a handset on the telephone device. The hook switch according to claim 3 comprises an electronic hook switching unit transmitting a hook switching signal to the telephone device. This enables the user to remotely accept and terminate a call.

The communications device according to claim 4 comprises a base station and a headset. This enables the user to remotely receive an incoming call.

According to claim 5, the base station of the communications device and/or the ringtone detector is integrated in a housing of the hook switch. This enables the communications system to be compact and less bulky.

The ringtone detector according to claim 6 comprises one or more filter/amplifier stages and a microprocessor controlling the filter/amplifier stages. The filter/amplifier stages according to claim 7 comprise two or more parallel pipelines containing at least a bandpass filter and a detector. The filter/amplifier stages according to claim 8 comprise at least two or more bandpass filters, a detector connected to each bandpass filter, and two or more daisy-chain connections between different bandpass filters. This enables the ringtone detector to extract desired characteristics from the sensed ringing signal.

The microprocessor according to claim 9 adaptively sets the parameters for the filter/amplifier stages according to the sensor position and pick-up sensitivity. According to claim 10, the sensor is an electromagnetic sensor located on or in the proximity of a loudspeaker on the telephone device. According to claim 11, the electromagnetic sensor is located in a position different from the loudspeaker centre, or in a position where the strongest electromagnetic signal is detected. According to claim 12, the sensor is a vibration sensor, a piezoelectric sensor, or an audio pick-up sensor. This enables the ringtone detector to extract the characteristics at an optimum detection range, without the sensor having to be placed in a specific position.

According to claim 13, the ringtone detector comprises transmitting means connected to the hook switch for transmitting a hook switching signal to the telephone device.

The method according to the invention is characterized in that one or more characteristics of a new ringtone is/are learned and stored in a memory. According to claim 15, the characteristics of a new ringtone are automatically detected, learned and stored in the memory. The characteristics according to claim 16 comprise at least ringing volume, type of ringtone, or tunes. This reduces the amount of user interaction during installation and operation.

According to claim 17, the controller adaptively sets the filter parameters and amplifier parameters. According to claim 18, the controller sets the parameters according to the sensor position and pick-up sensitivity.

According to claim 19, the sensor is an electromagnetic sensor located on or in the proximity of a loudspeaker in a position in which the detected signal is not the strongest. This eliminates the calibration process when setting the detection range for new ringtones.

BRIEF DESCRIPTION OF THE DRAWINGS

The invention will be explained in detail below with reference to the drawing illustrating preferred embodiments of the invention, and in which.

MODES OF CARRYING OUT THE INVENTION

The desk phone 1 may be a common telephone device with a wired or a wireless telephone handset connected to a PBX network, the PSTN, or another type of telephone network.

Figure 1:
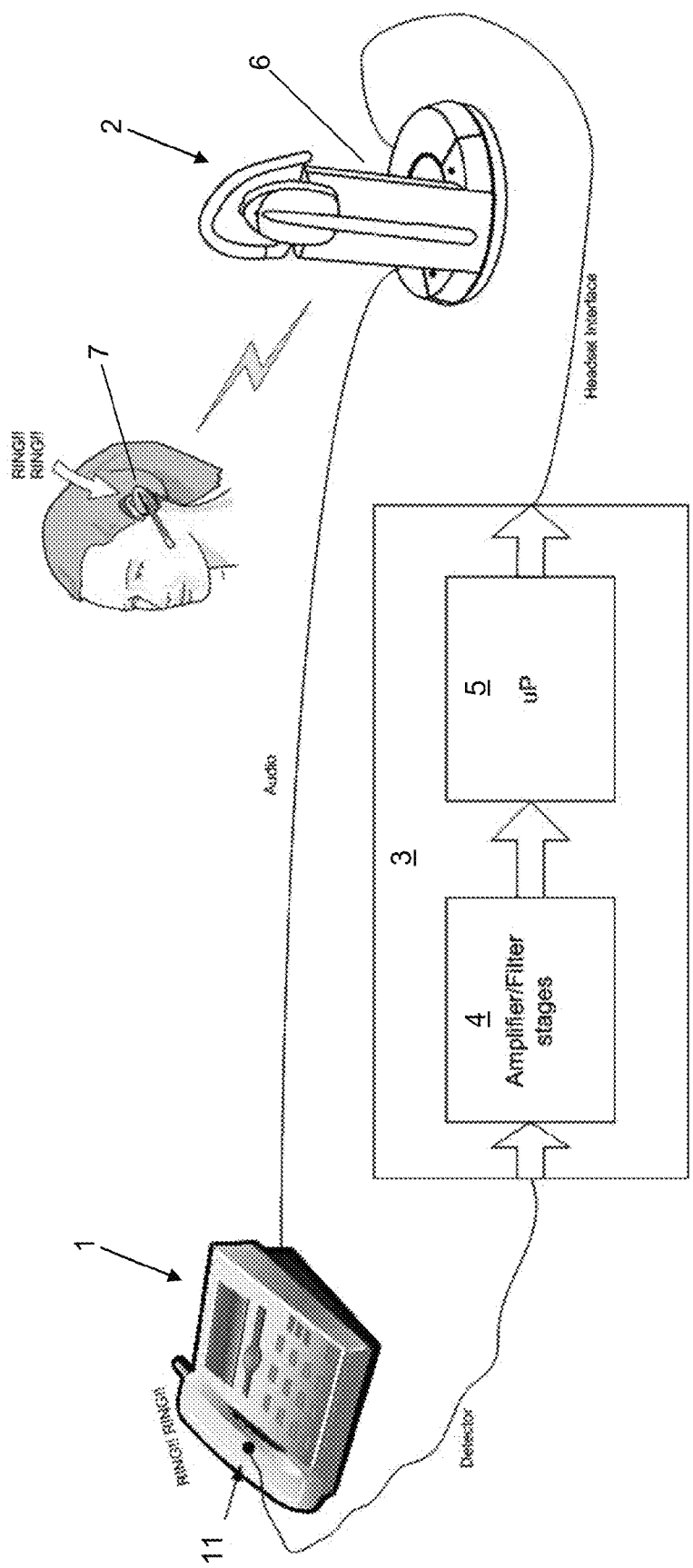
FIG. 1 shows a block diagram of a first exemplary embodiment of the invention.

FIG. 1 shows a block diagram of the invention in a first exemplary embodiment. In the first embodiment, the hook switch comprises a hook switch device (not shown) with mechanical lifting means extending from a hook switch housing for hooking off a telephone handset when activated. The hook switch device is placed adjacent to the handset, so that the lifting means extends beneath the handset. The mechanical construction of the lifting means is known and will not be described in detail. The construction enables the hook switch to fit almost any type of desk phone 1 produced today.

The hook switch has a wired or a wireless connection to a communications device 2. When the hook switch device receives a 'call accepted' signal from the communications device 2, an activation signal is sent to the mechanical lifting means. The telephone handset is then lifted to a certain height, which will activate a cradle switch (not shown) in the desk phone 1, thereby disrupting the ringing signal transmitted through a loudspeaker 10 in the desk phone 1. The incoming call is then transmitted from the desk phone 1 to the communications device 2. Upon terminating the call, the hook switch receives a 'call terminated' signal from the communications device 2 and lowers the handset.

The communications device 2 may comprise a base station 6 and a wired or a wireless headset 7, which enables a user to remotely receive an incoming call. The base station 6 contains at least a processing unit, a power supply unit, and a transmitter/receiver unit, and the headset 7 contains at least one user-operated button. Other types of communications devices capable of receiving and processing a telephone call may be used instead. In the first embodiment, the handset is disconnected from the desk phone 1 and is connected to a desk phone interface (not shown) on the communications device 2, and the communications device 2 is connected to the handset interface (not shown) on the desk phone 1.

When the base station 6 receives a ringtone signal from a ringtone detector 3, the base station 6 generates an alert signal and transmits it to the headset 7. The user then accepts the incoming call via the headset 7, which transmits an accept signal back to the base station 6. A 'call accepted' signal is then generated in the base station 6 and transmitted to the hook switch. When the call is terminated by the user, or the base station 6 no longer receives the audio signal from the desk phone 1, a 'call terminated' signal is generated and transmitted to the hook switch.

A ringtone detector 3 is coupled to the desk phone 1 for detecting a ringtone in a ringing signal. The ringtone detector 3 comprises at least a power supply unit, one or more amplifier/filter stages 4, and a microprocessor 5 containing software-implemented algorithms. The ringtone detector 3 will be described in detail in connection with FIGS. 3 and 4.

In order to make the invention less bulky, the ringtone detector 3 may be incorporated in the hook switch housing. In order to make the invention even more compact, the hook switch, the ringtone detector 3, and the base station 6 may be incorporated in the same housing. The hook switch housing may then have an antenna located on the outside or on the inside of the housing in order to communicate with the headset 7 and a cradle or a protrusion for holding the headset 7.

A sensor 11 for sensing a ringing signal is connected to the ringtone detector 3 and is placed in a position on or in the proximity of a loudspeaker 10 on the desk phone 1. If the loudspeaker 10 is located beneath the handset of the desk phone 1, then the sensor 11 may be situated in a slit on the mechanical lifting means enabling it to be moved into position. If the loudspeaker 10 is located elsewhere, then an adhesive element may attach the sensor 11 to the surface of the desk phone 1 at the desired position.

The sensor 11 may be a vibration sensor, e.g. a piezoelectric sensor, or an audio sensor, e.g. a microphone. These types of sensors tend to be more susceptive to environmental conditions and may require more processing in order to avoid false ringing. An electromagnetic sensor is less susceptive to environmental conditions, since it only senses the emitted electromagnetic field as described in the prior art.

Figure 2:
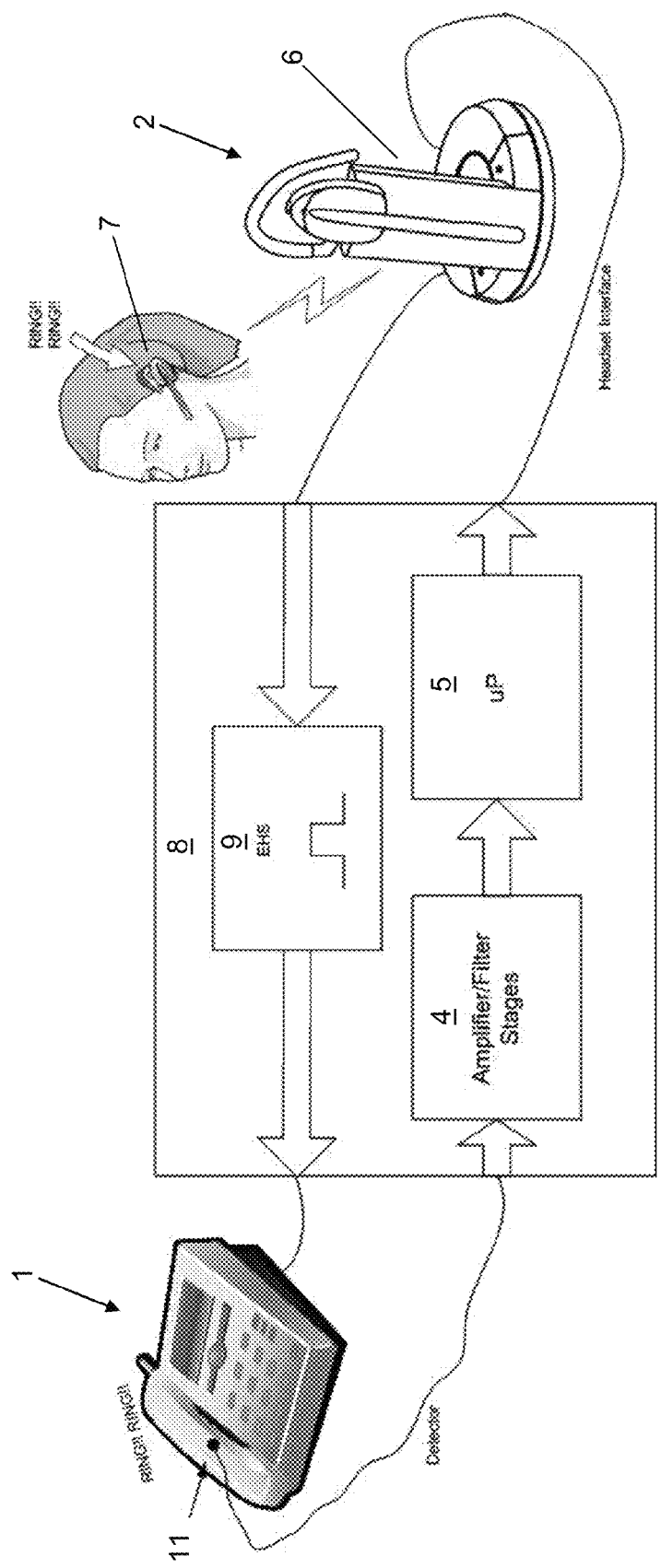
FIG. 2 shows a block diagram of a second exemplary embodiment of the invention.

FIG. 2 shows a block diagram of the invention in a second exemplary embodiment. In the second embodiment, the desk phone 1 has a headset interface (not shown), while the desk phone 1 in the first embodiment does not have a headset interface. The desk phone 1 is set to a headset mode using a headset button (not shown) on the desk phone 1. The components of the desk phone 1 are the same as those described in connection with FIG. 1.

In the second embodiment, the hook switch comprises a hook switch housing containing at least a power supply unit, a processing unit, an electronic hook switching unit 9, and an interface. The hook switch has a wired or a wireless connection to the headset interface on the desk phone 1, and a desk phone interface (not shown) on the communications device 2.

When the electronic hook switch unit 9 receives a 'call accepted' signal from the communications device 2, an off-hook switch signal is generated and transmitted to the desk phone 1. The desk phone 1 then stops the ringing signal generated in the loudspeaker 10 and transmits the incoming call through the hook switch to the communications device 2. When terminating a call, the electronic hook switch unit 9 receives a 'call terminated' signal from the communications device 2, and a hook switch signal is then generated and transmitted to the desk phone 1.

The communications device 2 may have a base station 6 and a wired or a wireless headset 7. Other types of communications devices capable of receiving and processing incoming calls may be used instead. The components of the communications device 2 are described in connection with FIG. 1.

When the base station 6 receives a ringtone signal from the ringtone detector, an alert signal is generated and transmitted to the headset 7. A user may then accept the call using a button on the headset 7, thus generating an accept signal and transmitting it back to the base station 6. The base station 6 then generates a 'call accepted' signal and transmits it to the hook switch. When the call is terminated by the user, or the base station 6 no longer receives the audio signal from the desk phone 1, a 'call terminated' signal is generated and transmitted to the hook switch.

The ringtone detector has a wired or a wireless connection to the base station 6 and a sensor 11 located on the desk phone 1. The ringtone detector comprises at least a power supply unit, one or more amplifier/filter stages 4, and a microprocessor 5 containing software-implemented algorithms. The ringtone detector will be described in detail in connection with FIGS. 3 and 4.

In the preferred form, the ringtone detector and the hook switch may be incorporated in the same housing 8, which makes the invention less bulky. In order to make the invention even more compact, the hook switch, the ringtone detector, and the base station 6 may be incorporated in the same housing. The hook switch housing may then have an antenna located on the outside or on the inside of the housing in order to communicate with the headset, and a cradle or a protrusion for holding the headset.

The sensor 11 is positioned on or adjacent to a loudspeaker 10 on the desk phone 1 using an adhesive element. The sensor 11 is the same as that described in connection with FIG. 1.

Alternatively, the ringtone detector 3 may be connected to the hook switch also (not shown). If a 'call accepted' signal is not received after a predetermined number of ringtone signals or a predetermined time period, the ringtone detector 3 generates a hook switching signal. The hook switching signal is then transmitted to the hook switch, which disrupts the ringing signal by either terminating the call or accepting the call. If the call is accepted, the desk phone 1 transmits the incoming call to the communications device 2 or a telephone answering machine or service (not shown).

Figure 3:
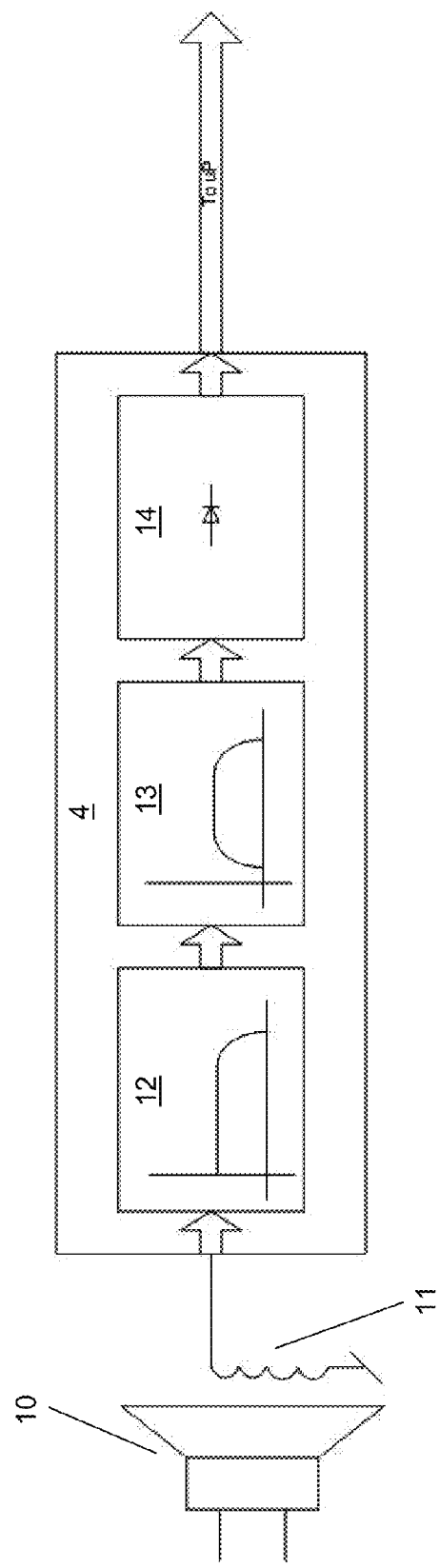
FIG. 3 shows a detailed block diagram of the amplifier/filter stages shown in FIG. 1.

FIG. 3 shows a more detailed block diagram of the amplifier/filter stages 4 in the ringtone detector 3. The ringtone detector 3 may comprise one or more hardware-implemented filters 12 and/or amplifiers, which reduce the sensed noise of the ringing signal. The sensed signal is then transmitted to one or more bandpass filters 13.

The hardware-implemented bandpass filters 13 extract one or more characteristics of the sensed ringing signal. The filter constructions are known and will not be described in detail. The filter parameters are set to various frequency bands, cut-off frequencies, and orders (cut-off band), which are all controlled by the microprocessor 5.

The bandpass filters 13 may be connected to the noise filter(s) 12 in a parallel manner, in which the sensed signal is transmitted to each bandpass filter 13. This parallel connection enables the ringtone detector 3 to have a better extraction of the desired characteristics. The bandpass filters 13 may instead have a serial/daisy-chain connection to the noise filter(s) 12, in which the sensed signal is transmitted to a first bandpass filter, and the output of each bandpass filter is connected to the input of the next bandpass filter. This serial/daisy-chain connection enables the ringtone detector 3 to have high pick-up sensitivity.

One or more detectors 14 are also connected to each filter output. The detectors 14 are set to detect specific frequency/frequencies or other desired characteristics within each frequency band. The constructions of these detectors 14 are known and will not be described in detail. The detector outputs are transmitted to the microprocessor 5 shown in FIG. 4.

Figure 4:
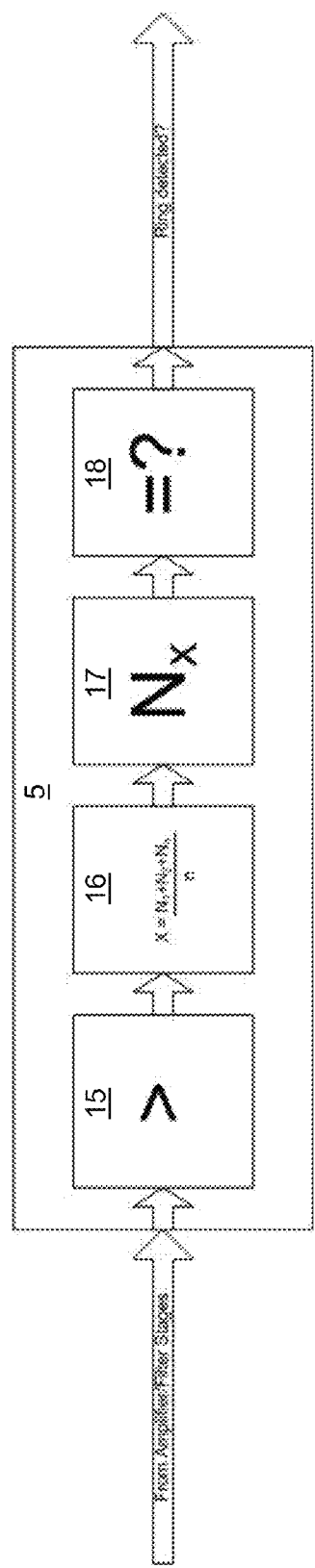
FIG. 4 shows a detailed block diagram of the functional units that make up the microprocessor shown in FIG. 1.

FIG. 4 shows a more detailed block diagram of the functional units that make up the microprocessor 5. The microprocessor 5 comprises a comparator unit 15, an averaging unit 16, a sampler unit 17, a pattern detector unit 18, and a controller (not shown).

Each unit may comprise the same number of sub-units as the number of characteristics extracted by the detector outputs.

The comparator unit 15 compares each detector output to one or more thresholds stored in a table or in a memory (not shown), which thresholds define the characteristics of different ringtones. If the extracted characteristic is equal to or greater than the threshold, then the signal is transmitted to an averaging unit 16. If the extracted characteristic is below the threshold, then the signal is discarded.

The averaging unit 16 averages the comparator output over a predetermined time period (N samples) in order to determine later on if the signal does in fact represent a characteristic of a ringtone.

The sampler unit 17 comprises a sequential sampler, a sigma-delta sampler, or another type of sampler. The sampler unit 17 converts the averaged signal into suitable samples for the pattern detector unit 18. The averaged signal may be oversampled or undersampled, and the sampling sequence for each averaged signal may differ.

The pattern detector unit 18 compares these samples to distinctive ringtones stored in a memory (not shown). Each distinctive ringtone is defined by a set of samples describing the characteristics of that ringtone. When the extracted characteristics match a set, the ringtone detector 3 transmits a ringtone signal to the communications device 2.

The characteristics may be ringing volume, type of ringtone, tunes, or other distinctive features. Since the use of custom made ringtones increases, the ringtone detector 3 may also detect the repeated time period (standard cadence pattern) used when playing the ringtone or other type of repeated patterns or sequences for that matter.

The controller controls the operation of the functional units and various components in the filter/amplifier stages 4 via one or more control lines (not shown). The controller may adjust the gain and filter parameters in accordance with the sensor position and pick-up sensibility. This enables the ringtone detector 3 to have an optimum detection range when extracting the characteristics of various ringtones.

If the pattern detector unit 18 determines that the sensed signal does not match the stored ringtones, it transmits an 'unknown' ringtone signal to the controller. The controller then starts a learning process.

In the learning process the controller adjusts the gain and filter parameters, so that the filter/amplifier stages 4 have an optimum detection range, following which the pattern detector unit 18 determines if the sensed signal has any repeated patterns or sequences. If the sensed signal has repeated patterns or sequences, then the sensed signal is a new ringtone, if not, then the sensed signal is discarded. The characteristics extracted by the filter/amplifier stages 4 are stored in the memory as a new set of samples. After storing the new ringtone, the controller transmits a ringtone signal to the communications device 2. The learning process is preferably done in an automatic manner, which reduces required user interaction during installation or operation.

The functional units may also include an ND converter (not shown) for converting the extracted characteristics into digital signals for the functional units.

Alternatively, the filter/amplifier stages 4 may also be implemented in the microprocessor 5. This will enable the controller to improve the bandpass filtration and the operation of the amplifier/filter stages 4.

Alternatively, the incoming call may be transmitted directly to the ringtone detector 3, which may be reconfigured so that it can detect the ringtone within the incoming call, or to a second ringtone detector (not shown) configured for this purpose.

In the preferred embodiments, the sensor 11 may be placed on the desk phone 1 at a discrete location like on the sides or on the back. The sensor 11 may also be placed in the cradle holding the handset. In this way, the sensor 11 is not a dominant feature in the aesthetic appearance.

By placing the sensor 11 on the surface of the desk phone 1, the invention is suitable for almost any type of desk phones produced. Since the controller is able to adjust the gain of the filter/amplifier stages 4 in order to obtain the optimum detection range, the sensor 11 is not required to be placed in a certain position. This eliminates the calibration process during installation, while making the installation simpler.

The invention described above is not limited to one type of sensor, since a second type of sensor (not shown) can be connected to the second ringtone detector in order to improve the ringtone detection.

The hook switch housing may also comprise light emitting diodes to visually indicate certain operational conditions like power on, ringtone detected, data communication, etc.

The invention claimed is:

1. A communications system for use with a hook switching device capable of hook switching the telephone on and off hook when a call is accepted or terminated comprising:
   a communications device in communication with a telephone device,
   a sensor located on the telephone device for sensing a ringing signal, and
   a ringtone detector connected to the sensor and the communications device, wherein the ringtone detector comprises a feature extractor associated with the ringtone detector, which detects and learns distinctive ringtones,
   a ringtone feature memory capable of storing characteristics of ringtones for later retrieval and comparison;
   a comparator for comparing previously stored ringtone characteristics to incoming ringtone characteristics;
   an alert generator, responsive to said comparator when the comparator identifies a match with a previously learned ringtone characteristics and then generates an alert signal in response thereto.

2. A communications system according to claim 1, wherein the hook switching device comprises a hook switching device with mechanical lifter for lifting and lowering a handset on the telephone device.

3. A communications system according to claim 1, wherein the hook switching device comprises an electronic hook switching unit transmitting a hook switching signal to the telephone device.

4. A communications system according to claim 1, wherein the ringtone detector comprises one or more filter/amplifier stages and a microprocessor controlling the filter/amplifier stages.

5. A communications system according to claim 4, wherein the filter/amplifier stages comprise two or more parallel pipelines containing at least a bandpass filter and a detector.

6. A communications system according to claim 4, wherein the filter/amplifier stages comprise at least two bandpass filters, a detector connected to each bandpass filter, and at least two daisy-chain connections between different bandpass filters.

7. A communications system according to claim 4, wherein the microprocessor adaptively sets the parameters for the filter/amplifier stages according to the sensor position and pick-up sensitivity.

8. A communications system according to claim 1, wherein the sensor is a vibration sensor, a piezoelectric sensor, or an audio pick-up sensor.

9. A Communications system according claim 1, wherein the ringtone detector comprises a transmitter connected to the hook switch for transmitting a hook switching signal to the telephone device.

10. A communications system for use with a telephonic communications device, comprising:
    a sensor located proximate the telephonic device capable of sensing its ring signal, and
    a ringtone detector connected to the sensor, including a feature extractor which detects and learns distinctive ringtones automatically,
    a ringtone memory capable of storing characteristics of extracted ringtones for later retrieval and comparison;
    comparator for comparing previously stored ringtone characteristics to incoming ringtone characteristics
    alert generator, responsive to said comparator to send an alert signal to the user when the comparator identifies a match with a previously learned ringtone.

11. A method of adaptively detecting and learning distinctive ringtones comprising:
    detecting a ringing signal from a sensor located on a telephone device,
    filtering the detected ringing signal to create a processed signal,
    determining one or more characteristics of a ringtone, and
    transmitting an alert signal to a communications device once a ringtone has been determined,
    wherein when a ringtone is determined to be new, one or more characteristics of that distinctive ringtone is/are learned and stored in a memory.

12. A method of adaptively detecting and learning distinctive ringtones according to claim 11, wherein the characteristics of a new ringtone are automatically detected, learned and stored in the memory.

13. A method of adaptively detecting and learning distinctive ringtones according to claim 11, wherein the characteristics comprise at least ringing volume, type of ringtone, or tunes.

14. A method of adaptively detecting and learning distinctive ringtones according to claim 11, wherein the method further comprises a controlling the settings of filter parameters and amplifier parameters.

15. A method of adaptively detecting and learning distinctive ringtones according to claim 14, controlling the filter parameters according to the sensor position and pick-up sensitivity.

16. A method of adaptively detecting and learning distinctive ringtones according to claim 1, including locating the sensor in the proximity of a loudspeaker in a position distant from the point at which the detected signal would be maximal.

17. The method of adaptively detecting and learning distinctive ringtones according to claim 11, wherein the characteristics of a new ringtone are automatically detected, learned stored in the memory and when a particular learned ringtone is detected on a subsequent ring, a predetermined alert signal is generated.

18. The method of adaptively detecting and learning distinctive ringtones according to claim 17, a predetermined alert signal is generated for at least some of said learned ringtones, and wherein a different alert signal is generated for at least some of said learned ringtones.

19. The method of adaptively detecting and learning distinctive ringtones according to claim 11, wherein the characteristics comprise at least ringing volume, type of ringtone, or tunes.

* * * * *